United States Patent [19]

Forsberg

[11] Patent Number: 4,946,024
[45] Date of Patent: Aug. 7, 1990

[54] PROCEDURE AND APPARATUS FOR SEPARATING BATCHES FROM A STREAM OF LOGS

[75] Inventor: Matti Forsberg, Lahti, Finland

[73] Assignee: Kone Oy, Helsinki, Finland

[21] Appl. No.: 286,734

[22] Filed: Dec. 20, 1988

[30] Foreign Application Priority Data

Dec. 22, 1987 [FI] Finland .................................. 875670

[51] Int. Cl.⁵ ............................................. B65G 47/00
[52] U.S. Cl. ..................................................... 198/429
[58] Field of Search ....................... 198/429, 426, 463.3, 198/468.8; 414/746.1, 745.7, 745.1, 907

[56] References Cited

U.S. PATENT DOCUMENTS

| | | | |
|---|---|---|---|
| 4,362,460 | 12/1982 | Peddinghaus | 198/443 X |
| 4,573,860 | 3/1986 | Peddinghaus | 198/443 X |
| 4,871,059 | 10/1989 | Rantanen et al. | 198/532 |

FOREIGN PATENT DOCUMENTS

| | | |
|---|---|---|
| 3811137 | 11/1988 | Fed. Rep. of Germany . |
| 72355 | 1/1987 | Finland . |
| 145923 | 11/1980 | Japan .................. 198/468.8 |

*Primary Examiner*—Robert J. Spar
*Assistant Examiner*—Cheryl L. Gastineau
*Attorney, Agent, or Firm*—Birch, Stewart, Kolasch & Birch

[57] ABSTRACT

A procedure and apparatus for separating batches of logs from a continuous stream of logs on a belt, chain or other type of conveyor consists, according to the present invention, of two or more conveyor units with the batching operation taking place in gaps between the conveyor units. Current methods and devices require supervision and an operator to control the operation, e.g. via push buttons. The procedure and apparatus of the invention solves that problem in that the gaps are bridged, a batch of logs is entrapped between conveyor units and then the batch of entrapped logs may be lifted clear of the stream for further processing.

8 Claims, 1 Drawing Sheet

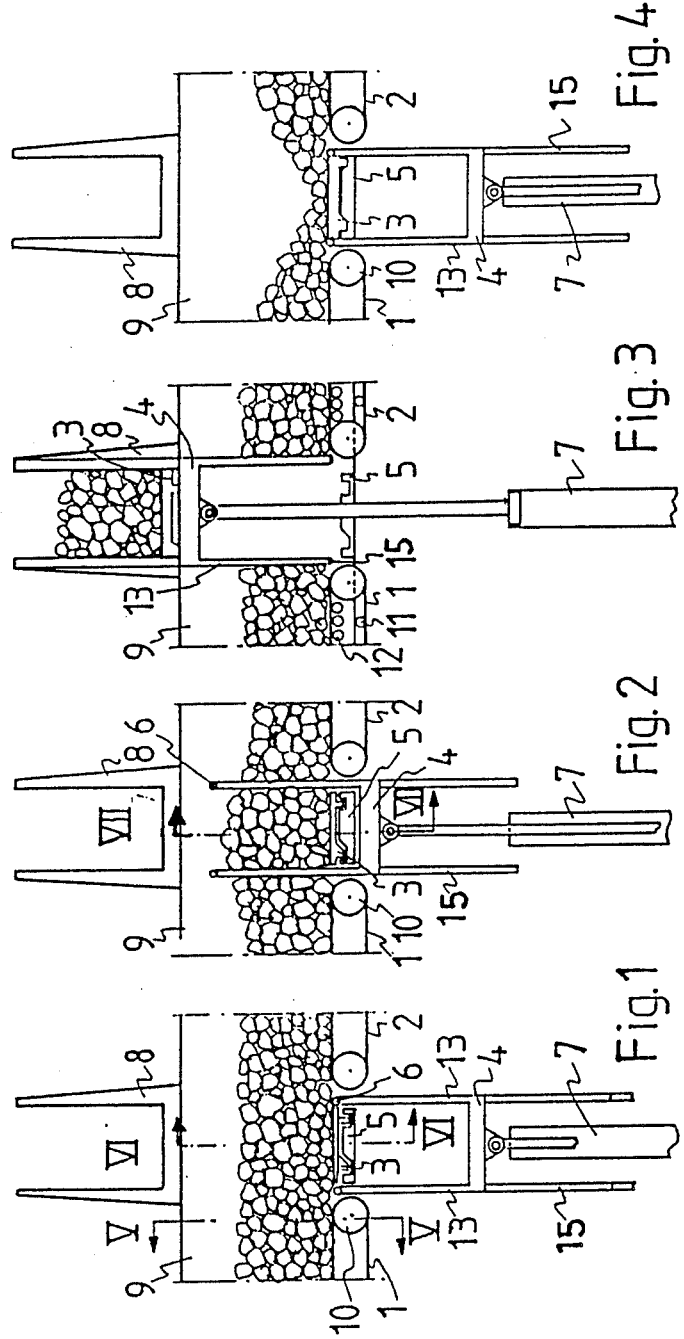
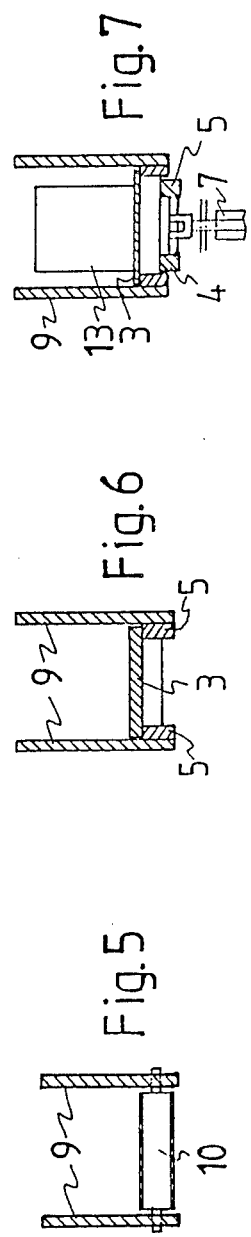

PROCEDURE AND APPARATUS FOR SEPARATING BATCHES FROM A STREAM OF LOGS

BACKGROUND OF THE INVENTION

1. Field of the Invention

The present invention relates to a procedure and apparatus for separating batches of logs from a continuous stream of logs on a belt or chain conveyor consisting of two or more conveyor units, with the batching operation taking place in gaps between the conveyor units.

2. Description of Related Prior

At present, there are devices for separating batches of logs from a stream of logs, e.g., to supply a grinding machine. One such device is presented in FI No. 72355, which comprises a lowering means placed below the conveyor level in the gaps between the conveyor units and gripping means for holding the logs in place, arranged above the lowering means on each side of the stack. The lowering means is rotatably mounted at one end and swivelled, e.g., by means of a hydraulic cylinder. The operation of that device has proved inadequate in practice. The gripping means can not always get a good hold at the ends of the logs because the latter are apt to turn askew, causing disturbances in operation. Moreover, that device and other known batching devices have the drawback that they need supervision and an operator to control their operation, e.g., by means of push-buttons. Such devices also occupy a large space in the vertical direction.

SUMMARY OF THE INVENTION

An object of the present invention is to achieve a procedure and apparatus for separating a batch of logs from a continuous stream of logs so as to obviate the drawbacks referred to.

Accordingly, the present invention provides a procedure for separating batches of logs from a continuous stream of logs on a belt, chain or other type of conveyor comprising a plurality of conveyor units, with a batching wherein the gaps are bridged by blocking means, limiter means are pushed up through the stream of logs, and a batch of logs entrapped between the blocking means and the limiter means is lifted clear of the stream for further processing.

Also, the present invention provides an apparatus for separating batches from a continuous stream of logs on a belt or chain conveyor comprising a plurality of conveyor units, with a batching operation taking place in gaps between the conveyor units comprising blocking means to close the gaps and movable in the vertical direction, two or more upper limiter means which are capable of being pushed up through the stream of logs, and lifting means with which a batch of logs entrapped between the blocking means and the limiter means can be lifted clear of the stream for further processing.

BRIEF DESCRIPTION OF THE DRAWINGS

Further objects, features and advantages of the invention will become apparent to those skilled in the art from the following descriptions thereof when taken in conjunction with the accompanying drawings, in which:

FIG. 1 is a side view of the batching apparatus of the invention at a stage when the lifting means is in its lowest position and the gap between the conveyors is blocked by the blocking means, FIG. 2 shows the apparatus of FIG. 1 at a stage when the lifting means is in an intermediate position, FIG. 3 shows the apparatus of FIG. 1 at a stage when the lifting means and the blocking means are in its highest position, FIG. 4 shows an apparatus of FIG. 1 at a stage when the batch has been removed from the feeder and the lifting means has sequentially moved from the positions illustrated in FIGS. 3 through 1, FIG. 5 shows an empty conveyor in cross-section along the line V—V in FIG. 1, FIG. 6 shows an empty conveyor and blocking means in cross-section along the line VI—VI in FIG. 1, and FIG. 7 shows an empty conveyor, blocking means, upper limiter means and lifting means along the line VII—VII in FIG. 2.

DESCRIPTION OF THE PREFERRED EMBODIMENTS

FIGS. 1–4 represent different stages of operation of the procedure and apparatus for batching logs provided by the invention. The logs are supplied by one or both of the conveyors 1, 2 onto the blocking means 3, e.g. a plate, so that a stack of a height determined by a sensor or sensors (not shown) placed on the walls 9 is built up. The invention makes use of Finnish Patent No. 45243, whereby a continuous stack of logs is maintained on the conveyors to prevent the logs from bunching up. The conveyors themselves may be of any type e.g. belt or chain conveyors.

The gap between the conveyors 1 and 2, bridged by the blocking means 3, is located near a grinding machine or a batching station. At the beginning of a cycle of operation, the gap is closed by the blocking means 3 and the lifting means 4 is in a lower position as shown in FIG. 1.

Next, the lifting means 4 is raised by means of a cylinder 7 or other mechanism so that a separate batch of logs is formed between the upper portion of limiter means 13, e.g. walls, the blocking means 3 and the side walls 9. At this stage, the blocking means 3 still rest on supports 5 as shown in FIG. 2. The upper edges of the upper portion of limiter means 13, i.e. the upper end of the upper walls of the lifting means 4, are provided with freely rotating rollers 6 to help the lifting means 4 penetrate the continuous stack of logs.

As the lifting means 4 rises further, it carries the blocking means 3 along with it, so that the latter now constitutes the base of the lifting means, as shown in FIG. 3. The batch is then lifted up, whereupon it can be delivered, e.g. directly to the intake of a grinder, by pushing the logs from one end of a feeder 8 to shove them off sideways relative to the stream.

The lifting means 4 can be emptied using a feeder 8 like those currently used with grinding machines. A pushing means incorporated in the feeder 8 pushes off the batch of logs from the lifting means 4, whereupon the lifting means 4 and the blocking means 3 are lowered to the position shown in FIG. 4. By operating the conveyors, more logs may be moved to the gap blocked by blocking means 3 until the stack height reaches the level determined by the stack height sensor (not shown), whereupon a new cycle of operation may begin.

FIG. 7 shows a solid wall 13 of the lifting means 4, but alternatively the upper portion of the upper limiter means 13 may consist of two or more vertical rods. The lower parts of the side walls 9 of the conveyor lines 1 and 2 are strong enough to support the bridge plate supporters 5 as well as the conveyor rollers 10 and the small belt-supporting rollers 11 and 12 shown in FIG. 3.

In addition to the upper portions of the limiter means 13, the limiter means 13 are provided with lower portions 15 which move along with the lifting means 4 to prevent the logs from getting into gaps between the conveyor units. The lower ends of the lower portions 15 of the limiter means 13 may comprise guide rods or similar means to guide the limiter means 13 to proper locations when the lifting means 4 moves downwards. Like the upper portions of the limiter means 13, the lower portions 15 of the limiter means 13 may also consist of a solid wall or two or more vertical rods.

It will be obvious to a person skilled in the art that the invention is not restricted to the embodiments described above, but that may instead be varied within the scope of the following claims.

I claim:

1. A procedure for separating batches of logs from a continuous stream of logs on a conveyor comprising a plurality of conveyor units, said separation of batches of logs taking place in gaps between said conveyor units, said procedure comprising
bridging said gaps by deploying blocking means in said gaps;
pushing limiter means up through said stream of logs to entrap logs between said blocking means, which serves as a pallet supporting one of said batches, and said limiter means;
and lifting said one batch clear of said stream for further processing.

2. A procedure according to claim 1, wherein lifting means mounted below said batch are used to push up, from below said stream of logs, said limiter means and said batch and to engage said blocking means.

3. An apparatus for separating batches from a continuous stream of logs on a conveyor comprising a plurality of conveyor units, with a batching operation taking place in gaps between said conveyor units comprising blocking means to close said gaps and movable in the vertical direction, two or more upper limiter means which are capable of being pushed up through said stream of logs, and lifting means with which a batch of logs entrapped between said blocking means and said limiter means can be lifted clear of the stream for further processing.

4. An apparatus according to claim 3, wherein said limiter means comprise a plurality of walls placed at a distance from each other, in a position transverse to the direction of movement of the logs on said conveyor, said walls being attached to said lifting means so that they move with the latter.

5. An apparatus according to claim 3, wherein each said limiter means comprise at least two vertical members placed at a distance from each other.

6. An apparatus according to claim 3, wherein the upper edges of the upper halves of said limiter means are provided with rotatable rollers to help said limiter means penetrate said stream of logs.

7. An apparatus according to claim 3, wherein said limiter means include lower portions below said lifting means substantially in alignment with said limiter means and capable of moving with said lifting means and said limiter means, preventing said stream of logs from getting into said gaps between said conveyor units.

8. An apparatus according to claim 7, wherein the lower ends of said lower portions of said limiter means are provided with means to guide said limiter means to proper locations when said lifting means moves downwards.

* * * * *